United States Patent
Akimoto et al.

(10) Patent No.: US 8,406,173 B2
(45) Date of Patent: Mar. 26, 2013

(54) MOBILE COMMUNICATION SYSTEM, BASE STATION APPARATUS, MOBILE STATION APPARATUS, AND MOBILE COMMUNICATION METHOD

(75) Inventors: Yohsuke Akimoto, Osaka (JP); Shohei Yamada, Osaka (JP); Hiroshi Katsuragawa, Osaka (JP); Tatsushi Aiba, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 564 days.

(21) Appl. No.: 12/664,264

(22) PCT Filed: Jun. 11, 2008

(86) PCT No.: PCT/JP2008/060712
§ 371 (c)(1),
(2), (4) Date: Dec. 11, 2009

(87) PCT Pub. No.: WO2008/153081
PCT Pub. Date: Dec. 18, 2008

(65) Prior Publication Data
US 2010/0296460 A1 Nov. 25, 2010

(30) Foreign Application Priority Data

Jun. 12, 2007 (JP) ................................. 2007-155296
Jul. 25, 2007 (JP) ................................. 2007-193486

(51) Int. Cl.
*H04W 4/00* (2009.01)
(52) U.S. Cl. ......... 370/328; 370/338; 370/339; 370/342
(58) Field of Classification Search ........................ None
See application file for complete search history.

(56) References Cited

U.S. PATENT DOCUMENTS

| 7,340,256 | B2 * | 3/2008 | Speight | 455/450 |
| 8,060,127 | B2 * | 11/2011 | Anderson | 455/522 |
| 8,072,918 | B2 * | 12/2011 | Muharemovic et al. | 370/319 |
| 2005/0085236 | A1 | 4/2005 | Gerlach et al. | |
| 2006/0198293 | A1 | 9/2006 | Nishio et al. | |
| 2008/0267131 | A1 * | 10/2008 | Kangude et al. | 370/331 |
| 2009/0122736 | A1 * | 5/2009 | Damnjanovic et al. | 370/311 |

FOREIGN PATENT DOCUMENTS

| EP | 1 892 975 A1 | 2/2008 |
| JP | 2005-130491 A | 5/2005 |
| JP | 2006-352382 A | 12/2006 |
| WO | WO-2005/015801 A2 | 2/2005 |
| WO | WO-2005/089004 A1 | 9/2005 |
| WO | WO-2007/052649 A1 | 5/2007 |

OTHER PUBLICATIONS

Japanese Office Action issued Dec. 20, 2011.

(Continued)

*Primary Examiner* — Xavier Szewai Wong
(74) *Attorney, Agent, or Firm* — Birch, Stewart, Kolasch & Birch, LLP

(57) ABSTRACT

A mobile communication system in which a mobile station apparatus transmits uplink data to a base station apparatus using a physical uplink shared channel that is allocated by an uplink data transmission permission signal, wherein the base station apparatus allocates, to the mobile station apparatus, by using a radio resource control signal, the physical uplink shared channel for the mobile station apparatus to transmit channel states information, and the mobile station apparatus periodically transmits, to the base station apparatus, the channel states information using the physical uplink shared channel.

18 Claims, 7 Drawing Sheets

OTHER PUBLICATIONS

Nortel, Signaling Support for Downlink MIMO Mode Adaptation, 3GPP TSG-RAN Working Group 1 Meeting #48bis, R1-071459, Mar. 26-30, 2007, pp. 1-4.

CQI handling during DRX, R2-071901, 3GPP TSG-RAN2 Meeting #58, May 7-11, 2007, Kobe, Japan.

* cited by examiner

FIG. 5

Reception quality information parameter list

| Index | Transmission channel | Number of OFDM symbols when simultaneously transmitting uplink data and reception quality information (PUCCH) | Number of OFDM symbols when simultaneously transmitting uplink data and reception quality information (PUSCH) | Measurement interval | Frequency granularity | RANK (during MIMO) | Open loop/ Closed loop | MIMO mode |
|---|---|---|---|---|---|---|---|---|
| 1 | PUCCH | 2 | N/A | 3 | 25 | RANK1 | Open loop | Tx diversity |
| 2 | PUCCH | 4 | N/A | 5 | 50 | RANK1 | Open loop | Tx diversity |
| 3 | PUCCH | 8 | N/A | 10 | Full | RANK2 | Closed loop | SU-MIMO |
| 4 | PUSCH | N/A | 2 | 20 | 5 | RANK1 | Closed loop | SU-MIMO |
| 5 | PUSCH | N/A | 4 | 50 | 10 | RANK2 | Closed loop | MU-MIMO |
| 6 | PUSCH | N/A | 8 | 100 | 20 | RANK4 | Open loop | MU-MIMO |
| ... | ... | ... | ... | ... | ... | ... | ... | ... |
| ... | ... | ... | ... | ... | ... | ... | ... | ... |

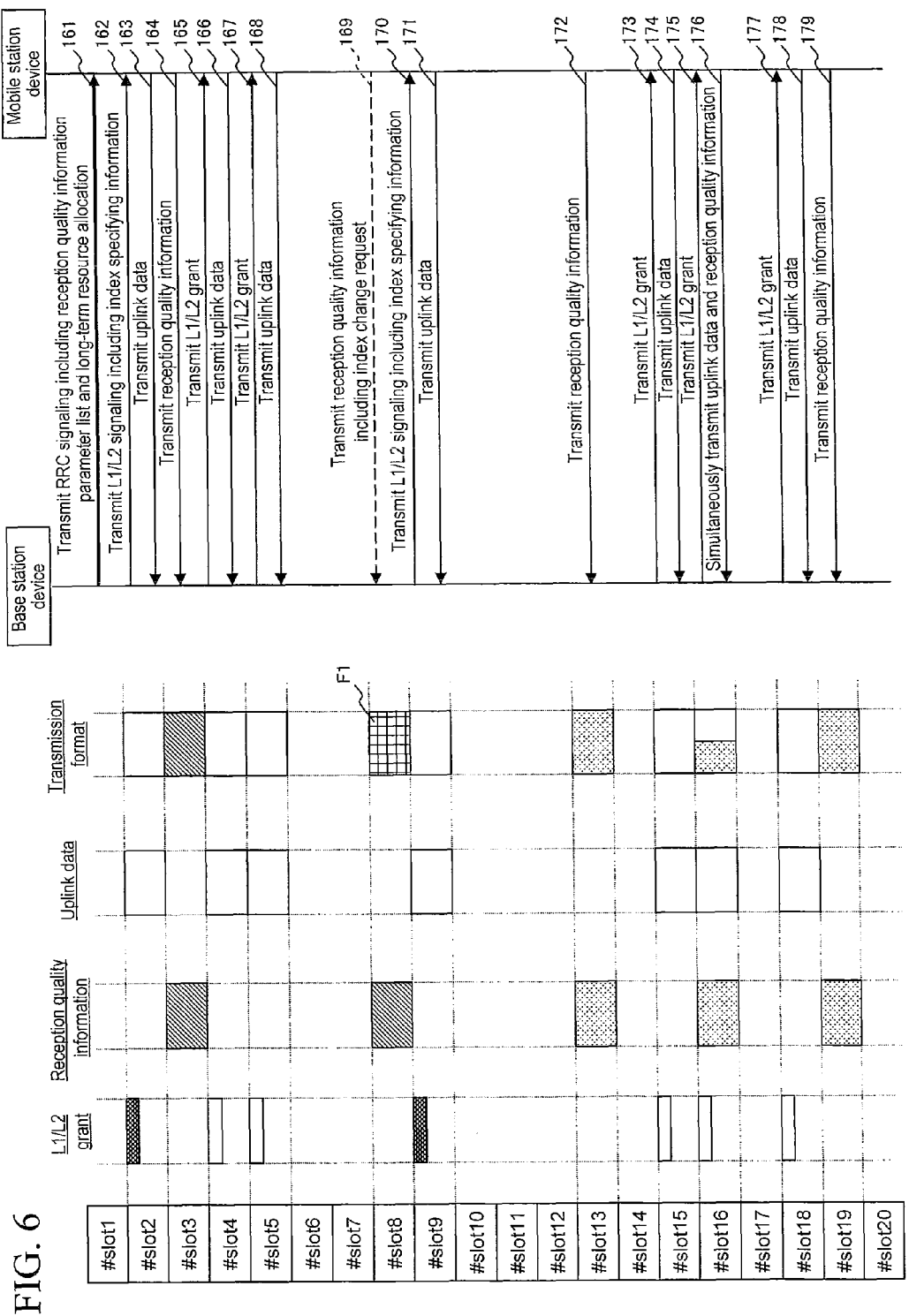

MOBILE COMMUNICATION SYSTEM, BASE STATION APPARATUS, MOBILE STATION APPARATUS, AND MOBILE COMMUNICATION METHOD

TECHNICAL FIELD

The present invention relates to a mobile communication system, a base station apparatus, a mobile station apparatus, and a mobile communication method, all of which are used to measure and transmit reception quality information.

BACKGROUND ART

The 3GPP (3rd Generation Partnership Project) is a project that reviews and produces specifications for mobile phone systems based on evolved W-CDMA (Wideband-Code Division Multiple Access) and GSM (Global System for Mobile Communications) networks. In 3GPP, the W-CDMA scheme has been standardized as a third generation cellular mobile communication scheme, and services have been launched in succession. In addition, HSDPA (High-Speed Downlink Packet Access) with even higher communication speeds has also been standardized, and services have been launched. In 3GPP, evolutions in third generation radio access technology (Evolved Universal Terrestrial Radio Access: hereinafter referred to as E-UTRA) are being studied.

As a downlink communication scheme in E-UTRA, the OFDMA (Orthogonal Frequency Multiple Access) scheme, in which user multiplexing is performed using mutually orthogonal subcarriers, has been proposed. In addition, in the OFDMA scheme, such technologies as adaptive modulation/demodulation and error correction schemes (AMCS: Adaptive Modulation and Coding Schemes) based on such adaptive radio link control (link adaptation) as channel coding and the like are employed. AMCS refers to a scheme in which, in order to efficiently perform high-speed packet data transfer, radio transfer parameters (hereinafter referred to as AMC modes) such as error correction scheme, error correction coding rate, data modulation level, and the like are switched in accordance with the propagation channel states of each mobile station apparatus. For example, with respect to data modulation, as propagation channel states improve, by switching from QPSK (Quadrature Phase Shift Keying) modulation to multilevel modulation schemes with better modulation efficiency such as 16-QAM (Quadrature Amplitude Modulation), 64-QAM, and the like, the maximum throughput of a mobile communication system can be increased.

In OFDMA, communicable domains can be divided in the frequency domain and the time domain physically corresponding to a subcarrier. These divided domains are grouped into several resource blocks. One or a number of resource blocks are allocated to each mobile station apparatus, and communications are performed where a plurality of mobile station apparatuses are multiplexed. In order for the base station and each of the mobile station apparatuses to perform communications at optimum quality and speed suitable for their demands, it is necessary that resource blocks be allocated and transfer schemes determined taking into account the reception quality for the frequency band corresponding to each subcarrier at each mobile station apparatus and the communication speed demands of the mobile station apparatuses. Since transfer schemes and scheduling are performed by the base station apparatus, in order to realize these demands, the base station apparatus must receive feedback on reception quality from each of the mobile station apparatuses.

In addition, in E-UTRA, the use of SDM (Space Division Multiplexing) which utilizes MIMO (Multiple Input Multiple Output), or of transmit diversity, such as SFBC (Space-Frequency Block Diversity), or CDD (Cyclic Delay Diversity), has been proposed in order to increase communication channel capacity. MIMO is a collective term for multiple input multiple output systems or technologies, and is characterized in that transmission is performed by plurally branching the input and output of radio waves using a plurality of antennas on the transmitting side and the receiving side. By using MIMO, due to the multipath effect, it becomes possible to multiplex and transmit a plurality of pieces of information by forming a plurality of propagation channels as spaces, and to combine the power of the plurality of transmit antennas on the receiving side to obtain reception gain. In E-UTRA, the use of SDM based on MIMO and of transmit diversity is assumed, and the base station apparatus must determine by which scheme communications are to be performed taking into account the reception quality at the base station apparatus. In addition, with respect to when SDM is used in the downlink, preprocessing transmission signal sequences in advance (which is referred to as precoding) is being considered in order to properly separate a plurality of streams of information transmitted from the respective antennas. Precoding information is calculated based on propagation channel information that is estimated by the mobile station apparatuses, and precoding information must be feed back from the mobile station apparatuses to the base station apparatus.

Thus, in order to realize communications at optimum quality, various information must be feed back from each mobile station apparatus to the base station apparatus. The number of bits and format of this reception quality information varies depending on the granularity and quality of the information. As an example, with respect to information indicating the reception quality of downlink states for each subcarrier for optimization in the above-mentioned allocation of resource blocks, in order to allocate the most suitable frequency domain, the channel states of the respective subcarriers (frequency characteristics, that is, characteristics such as frequency-dependent transmission loss and the like) must be measured, and each channel state must be quantized and feed back to the base station apparatus (see patent document 1 indicated below). A large amount of information is required to represent this channel information, and the reception quality information must be transmitted to the base station apparatus with varying degrees of frequency in accordance with changes in the channel states.

On the other hand, when feeding back AMC modes to the base station apparatus, only a small amount of information representing the modulation scheme (64-QAM, 16-QAM, QPSK) and the coding rate ($R=\frac{1}{3}$, $P=\frac{1}{4}$, and the like) is required.

In E-UTRA, the use of PUCCH (Physical Uplink Control Channel) as an uplink channel for performing this reception quality information has been considered. The PUCCH is a channel for maintaining a link in E-UTRA, and is a physical channel for multiplexing and transmitting two kinds of signals: a signal referred to as ACK/NACK, and a signal representing the reception quality information.

Of these signals, the ACK/NACK signal is a signal for notifying the base station apparatus from the mobile station apparatus whether or not the data channel transmitted in the downlink was received properly. The reception quality information is a signal for reporting downlink channel states, which is provided to the base station apparatus for controlling downlink transmission scheme.

As described above, there are various kinds of reception quality information that are transmitted from the mobile station apparatuses to the base station apparatus. Demands such as the size of the information amount transmitted, degree of frequency of transmission from the mobile station apparatus to the base station apparatus, and the like are different among one another.

In this respect, in non-patent document 1 indicated below, a proposal is made that, in transmitting the reception quality information from the mobile station apparatus to the base station apparatus, the reception quality information be transmitted using PUCCH or PUSCH (Physical Uplink Shared Channel) in accordance with service types, which have varying demands for the reception quality information. The PUSCH is a channel used for the transmission of normal data, and is a channel that is capable of transmitting larger information amounts than the PUCCH.

Patent Document 1: Japanese Patent Publication (Kokai) No. 2005-130491 A

Non-Patent Document 1: "CQI handling during DRX", 3GPP, TSG RAN WG2 Meeting #58, R2-071901, May 2007

DISCLOSURE OF THE INVENTION

Problem to be Solved by the Invention

However, in such conventional technologies as those mentioned above, there is no specific disclosure regarding, in transmitting the reception quality information from the mobile station apparatus to the base station apparatus on the PUCCH or the PUSCH, what kind of control information the base station apparatus uses to control the mobile station apparatus, and further, what kind of exchanges are carried out between the base station apparatus and the mobile station apparatus to transmit the reception quality information.

Transmission control of the reception quality information with varying information amount sizes to be transmitted and degrees of frequency of transmission must be controlled by the base station apparatus. This is because if each mobile station apparatus were to, at its own discretion, frequently transmit the reception quality information of large information amounts, the uplink resources in the cell would become scarce, and if it were to infrequently transmit the reception quality information of small information amounts, the uplink resources would be wasted.

In other words, in the transmission of the reception quality information from the mobile station apparatus to the base station apparatus, how the mobile station apparatus is controlled from the base station apparatus using what kind of control information, and how the reception quality information is transmitted by carrying out what kind of exchanges between the base station apparatus and the mobile station apparatus are important problems, and an efficient transmission control method that takes into consideration the information amount and degree of frequency of transmission of the reception quality information is needed.

The present invention is made in view of the circumstances mentioned above, and its object is to provide a mobile communication system, base station apparatus and mobile station apparatus that flexibly adapt to information amounts and degrees of transmission frequency of the reception quality information and that realize efficient transmission control.

Means for Solving the Problem

According to an aspect of the present invention, there is provided a mobile communication system in which a mobile station apparatus transmits uplink data to a base station apparatus using a physical uplink shared channel that is allocated by an uplink data transmission permission signal, wherein the base station apparatus allocates, to the mobile station apparatus, by using a radio resource control signal, the physical uplink shared channel for the mobile station apparatus to transmit channel states information, and the mobile station apparatus periodically transmits, to the base station apparatus, the channel states information using the physical uplink shared channel.

The base station apparatus allocates, to the mobile station apparatus, by using a radio resource control signal, a physical uplink control channel for the mobile station apparatus to transmit the channel states information, the mobile station apparatus periodically transmits, to the base station apparatus, the channel states information using the physical uplink control channel in case that the physical uplink control channel has been allocated, and periodically transmits, to the base station apparatus, the channel states information using the physical uplink shared channel in case that the physical uplink shared channel has been allocated.

According to an aspect of the present invention, there is provided a mobile communication system in which a mobile station apparatus transmits uplink data to a base station apparatus using a physical uplink shared channel that is allocated by an uplink data transmission permission signal, wherein the base station apparatus transmits, to the mobile station apparatus, a radio resource control signal including a first transmission interval for the mobile station apparatus to transmit channel states information using the physical uplink shared channel, transmits, to the mobile station apparatus, the uplink data transmission permission signal including information that sets the fact that the channel states information is to be transmitted using the physical uplink shared channel, and the mobile station apparatus periodically transmits, to the base station apparatus, the channel states information using the physical uplink shared channel in accordance with the first transmission interval, in case that it has been set that the channel states information is to be transmitted using the physical uplink shared channel.

The base station apparatus transmits, to the mobile station apparatus, a radio resource control signal including a second transmission interval for the mobile station apparatus to transmit channel states information using a physical uplink control channel, the mobile station apparatus periodically transmits, to the base station apparatus, the channel states information using the physical uplink control channel in accordance with the second transmission interval, and periodically transmits, to the base station apparatus, the channel states information using the physical uplink shared channel in accordance with the first transmission interval, in case that it has been set that the channel states information is to be transmitted using the physical uplink shared channel.

According to an aspect of the present invention, there is provided a mobile communication system in which a mobile station apparatus transmits uplink data to a base station apparatus using a physical uplink shared channel that is allocated by an uplink data transmission permission signal, wherein the base station apparatus transmits, to the mobile station apparatus, a radio resource control signal including a transmission interval for the mobile station apparatus to transmit channel states information using first resources of the physical uplink shared channel, transmits, to the mobile station apparatus, the uplink data transmission permission signal, the mobile station apparatus periodically transmits, to the base station apparatus, the channel states information using the first resources of the physical uplink shared channel in accordance with the transmission interval, and transmits, to the base station apparatus, the channel states information using second resources of the physical uplink shared channel that is allocated by the uplink data transmission permission signal, in case that the second resources of the physical uplink shared channel has been allocated by the uplink data transmission permission signal in transmitting the channel states information using the first resources of the physical uplink shared channel.

According to an aspect of the present invention, there is provided a base station apparatus in a mobile communication system in which a mobile station apparatus transmits uplink data to a base station apparatus using a physical uplink shared channel that is allocated by an uplink data transmission permission signal, the base station apparatus comprising: units for transmitting, to the mobile station apparatus, a radio resource control signal including a transmission interval for the mobile station apparatus to transmit channel states information using the physical uplink shared channel, units for transmitting, to the mobile station apparatus, the uplink data transmission permission signal including information that sets the fact that the channel states information is to be transmitted using the physical uplink shared channel.

According to an aspect of the present invention, there is provided a mobile station apparatus in a mobile communication system in which a mobile station apparatus transmits uplink data to a base station apparatus using a physical uplink shared channel that is allocated by an uplink data transmission permission signal, the mobile station apparatus comprising: units for receiving, from the base station apparatus, a radio resource control signal that allocates the physical uplink shared channel to transmit channel states information, and units for periodically transmitting, to the base station apparatus, the channel states information using the physical uplink shared channel.

The mobile station apparatus comprises: units for receiving, from the base station apparatus, a radio resource control signal that allocates a physical uplink control channel to transmit channel states information, units for periodically transmitting, to the base station apparatus, the channel states information using the physical uplink control channel in case that the physical uplink control channel has been allocated, and units for periodically transmitting, to the base station apparatus, the channel states information using the physical uplink shared channel in case that the physical uplink shared channel has been allocated.

According to an aspect of the present invention, there is provided a mobile station apparatus in a mobile communication system in which a mobile station apparatus transmits uplink data to a base station apparatus using a physical uplink shared channel that is allocated by an uplink data transmission permission signal, the mobile station apparatus comprising: units for receiving, from the base station apparatus, a radio resource control signal including a first transmission interval to transmit channel states information using the physical uplink shared channel, units for receiving, from the base station apparatus, the uplink data transmission permission signal including information that sets the fact that the channel states information is to be transmitted using the physical uplink shared channel, and units for periodically transmitting, to the base station apparatus, the channel states information using the physical uplink shared channel in accordance with the first transmission interval, in case that it has been set that the channel states information is to be transmitted using the physical uplink shared channel.

The mobile station apparatus comprises: units for receiving, from the base station apparatus, a radio resource control signal including a second transmission interval to transmit channel states information using a physical uplink control channel, units for periodically transmitting, to the base station apparatus, the channel states information using the physical uplink control channel in accordance with the second transmission interval, and units for periodically transmitting, to the base station apparatus, the channel states information using the physical uplink shared channel in accordance with the first transmission interval, in case that it has been set that the channel states information is to be transmitted using the physical uplink shared channel.

According to an aspect of the present invention, there is provided a mobile station apparatus in a mobile communication system in which a mobile station apparatus transmits uplink data to a base station apparatus using a physical uplink shared channel that is allocated by an uplink data transmission permission signal, the mobile station apparatus comprising: units for receiving, from the base station apparatus, a radio resource control signal including a transmission interval to transmit channel states information using first resources of the physical uplink shared channel, units for receiving, from the base station apparatus, the uplink data transmission permission signal, units for periodically transmitting, to the base station apparatus, the channel states information using the first resources of the physical uplink shared channel in accordance with the transmission interval, and units for transmitting, to the base station apparatus, the channel states information using second resources of the physical uplink shared channel that is allocated by the uplink data transmission permission signal, in case that the second resources of the physical uplink shared channel has been allocated by the uplink data transmission permission signal in transmitting the channel states information using the first resources of the physical uplink shared channel.

According to an aspect of the present invention, there is provided a communication method for a base station apparatus in a mobile communication system in which a mobile station apparatus transmits uplink data to a base station apparatus using a physical uplink shared channel that is allocated by an uplink data transmission permission signal, wherein transmitting, to the mobile station apparatus, a radio resource control signal including a transmission interval for the mobile station apparatus to transmit channel states information using the physical uplink shared channel, transmitting, to the mobile station apparatus, the uplink data transmission permission signal including information that sets the fact that the channel states information is to be transmitted using the physical uplink shared channel.

According to an aspect of the present invention, there is provided a communication method for a mobile station apparatus in a mobile communication system in which a mobile station apparatus transmits uplink data to a base station apparatus using a physical uplink shared channel that is allocated by an uplink data transmission permission signal, wherein receiving, from the base station apparatus, a radio resource control signal that allocates the physical uplink shared channel to transmit channel states information, and periodically transmitting, to the base station apparatus, the channel states information using the physical uplink shared channel.

The communication method for a mobile station apparatus, wherein receiving, from the base station apparatus, a radio resource control signal that allocates a physical uplink control channel to transmit channel states information, periodically transmitting, to the base station apparatus, the channel states information using the physical uplink control channel in case that the physical uplink control channel has been allocated, and periodically transmitting, to the base station apparatus, the channel states information using the physical uplink shared channel in case that the physical uplink shared channel has been allocated.

According to an aspect of the present invention, there is provided a communication method for a mobile station apparatus in a mobile communication system in which a mobile station apparatus transmits uplink data to a base station apparatus using a physical uplink shared channel that is allocated by an uplink data transmission permission signal, wherein receiving, from the base station apparatus, a radio resource control signal including a first transmission interval to transmit channel states information using the physical uplink shared channel, receiving, from the base station apparatus, the uplink data transmission permission signal including information that sets the fact that the channel states information is to be transmitted using the physical uplink shared channel, and periodically transmitting, to the base station apparatus, the channel states information using the physical uplink shared channel in accordance with the first transmission interval, in case that it has been set that the channel states information is to be transmitted using the physical uplink shared channel.

The communication method for a mobile station apparatus, wherein receiving, from the base station apparatus, a radio resource control signal including a second transmission interval to transmit channel states information using a physical uplink control channel, periodically transmitting, to the base station apparatus, the channel states information using the physical uplink control channel in accordance with the second transmission interval, and periodically transmitting, to the base station apparatus, the channel states information using the physical uplink shared channel in accordance with the first transmission interval, in case that it has been set that the channel states information is to be transmitted using the physical uplink shared channel.

According to an aspect of the present invention, there is provided a communication method for a mobile station apparatus in a mobile communication system in which a mobile station apparatus transmits uplink data to a base station apparatus using a physical uplink shared channel that is allocated by an uplink data transmission permission signal, wherein receiving, from the base station apparatus, a radio resource control signal including a transmission interval to transmit channel states information using first resources of the physical uplink shared channel, receiving, from the base station apparatus, the uplink data transmission permission signal, periodically transmitting, to the base station apparatus, the channel states information using the first resources of the physical uplink shared channel in accordance with the transmission interval, and transmitting, to the base station apparatus, the channel states information using second resources of the physical uplink shared channel that is allocated by the uplink data transmission permission signal, in case that the second resources of the physical uplink shared channel has been allocated by the uplink data transmission permission signal in transmitting the channel states information using the first resources of the physical uplink shared channel.

Effect of the Invention

According to a mobile communication technology of the present invention, it is possible to realize efficient transmission control that flexibly adapts to information amounts and degrees of transmission frequency of the reception quality information.

BRIEF DESCRIPTION OF THE DRAWINGS

FIG. 5 is a diagram showing one example of a reception quality information parameter list.

FIG. 6 is a diagram illustrating a process flow according to the fourth embodiment of the present invention.

BEST MODE FOR CARRYING OUT THE INVENTION

First Embodiment

Figure 1A:
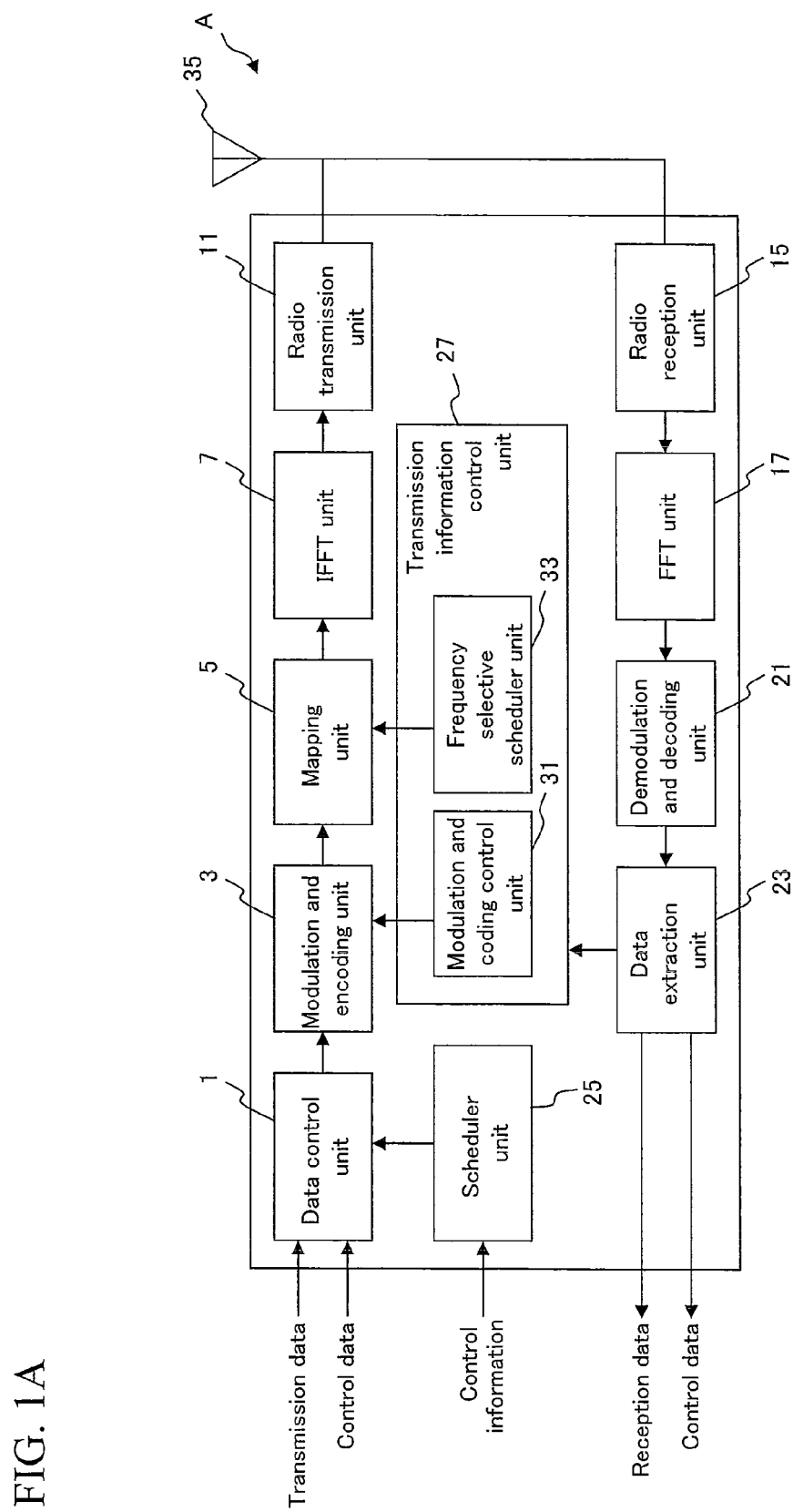
FIG. 1A is a schematic block diagram showing one configuration example of a base station apparatus in a mobile communication system according to the first embodiment of the present invention.
Figure 1B:
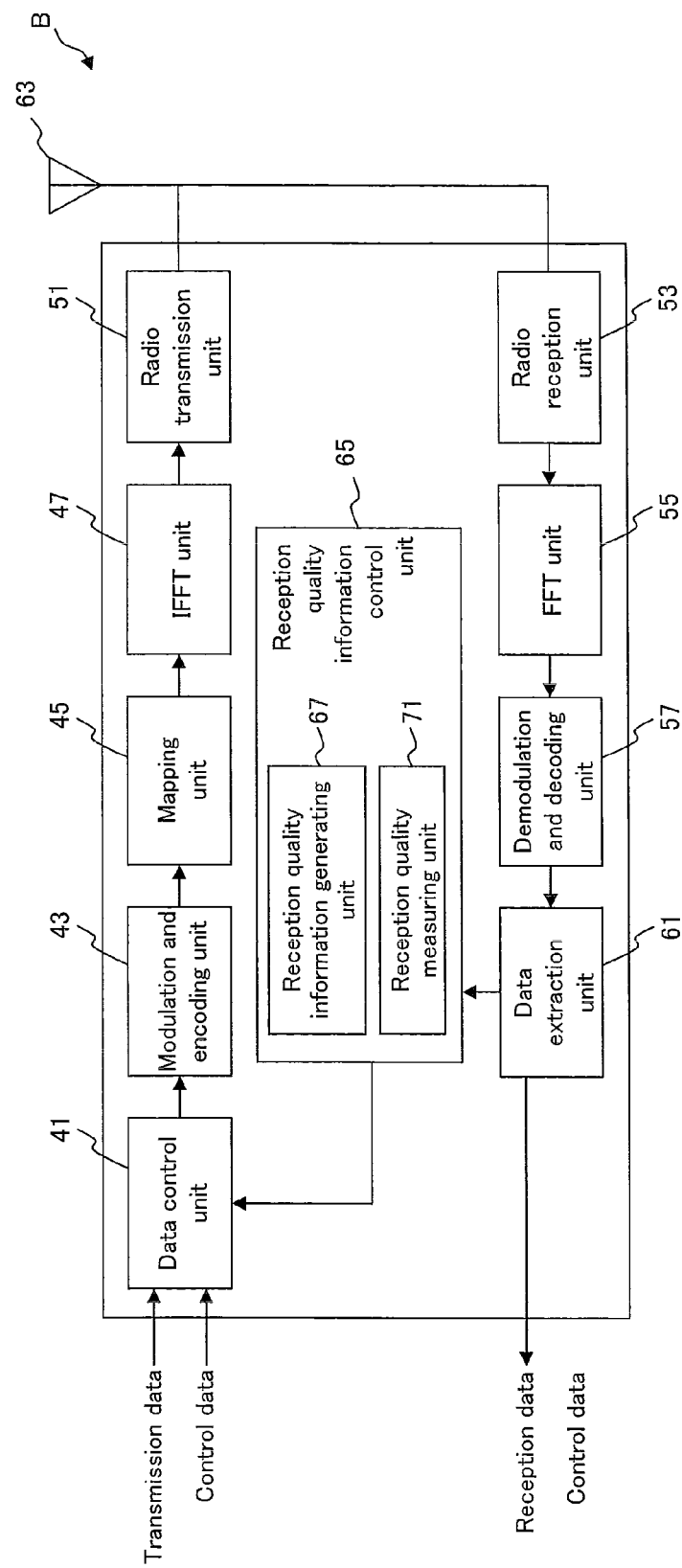
FIG. 1B is a schematic block diagram showing one configuration example of a mobile station apparatus in a mobile communication system according to the first embodiment of the present invention.

First, a mobile communication system according to the first embodiment of the present invention will be described. This mobile communication system comprises a base station apparatus and a mobile station apparatus. FIG. 1A and FIG. 1B are schematic block diagrams showing one configuration example of a mobile station apparatus and base station apparatus according to the present embodiment. As shown in FIG. 1A, a base station apparatus A comprises a data control unit 1, a modulation and encoding unit 3, a mapping unit 5, an Inverse Fast Fourier Transform (IFFT) unit 7, a radio transmission unit 11, a radio reception unit 15, a Fast Fourier Transform (FFT) unit 17, a demodulation and decoding unit 21, a data extraction unit 23, a scheduler unit 25, a transmission information control unit 27, and an antenna 35. The transmission information control unit 27 includes a modulation and coding control unit 31 and a frequency selective scheduler unit 33.

Transmission data and control data to be transmitted to each mobile station apparatus B are inputted to the data control unit 1, and the respective data are sequentially transmitted to the mobile station apparatuses B in accordance with instructions from the scheduler unit 25.

The modulation and encoding unit 3 performs a modulation process and error correction coding process with respect to signals outputted from the data control unit 1 based on a modulation scheme and coding rate determined by the modulation coding control unit 31, and outputs the respective data to the mapping unit 5.

Based on frequency selective scheduling information outputted from the frequency selective scheduler unit 33, the mapping unit 5 maps the data outputted from the modulation and encoding unit 3 to respective subcarriers and outputs them to the Inverse Fast Fourier Transform unit 7.

The Inverse Fast Fourier Transform unit 7 performs an Inverse Fast Fourier Transform process on the data outputted from the mapping unit 5 to convert them into chronological baseband digital signals, and outputs them to the radio transmission unit 11. The output signals from the Inverse Fast Fourier Transform unit 7 are digital/analog converted at the radio transmission unit 11, and, after being up-converted to a frequency suitable for transmission, are transmitted to the respective mobile station apparatuses B via the antenna 35.

The scheduler unit 25 performs downlink scheduling and uplink scheduling based on such control information as resource regions which the respective mobile station apparatuses are able to use, intermittent transmission/reception cycle, transmission data channel format, buffer state, and the like.

The modulation and coding control unit 31 determines the modulation schemes and coding rates to be applied to the respective data based on the reception quality information transmitted from the mobile station apparatuses B, and outputs them to the modulation and encoding unit 3.

The frequency selective scheduler unit 33 performs frequency selective scheduling processes that are applied to the respective data based on the reception quality information transmitted from the mobile station apparatuses B, and outputs the results thereof to the mapping unit 5.

The mobile station apparatus B comprises a data control unit 41, a modulation and encoding unit 43, a mapping unit 45, an Inverse Fast Fourier Transform (IFFT) unit 47, a radio transmission unit 51, a radio reception unit 53, a Fast Fourier Transform (FFT) unit 55, a demodulation and decoding unit 57, a data extraction unit 61, a reception quality information control unit 65, and an antenna 63. The reception quality information control unit 65 comprises a reception quality information generating unit 67 and a reception quality measuring unit 71.

Transmission data and control data to be transmitted to the base station apparatus A are inputted to the data control unit 41, and the respective data are sequentially transmitted to the base station apparatus A.

The modulation and encoding unit 43 performs a modulation process and an error correction coding process on signals that are outputted from the data control unit 41, and the respective data are outputted to the mapping unit 45.

The mapping unit 45 maps the data outputted from the modulation and encoding unit 43 to respective subcarriers, and outputs them to the Inverse Fast Fourier Transform unit 47.

The Inverse Fast Fourier Transform unit 47 performs an Inverse Fast Fourier Transform process on a symbol sequence outputted from the mapping unit 45, converts it into a chronological baseband digital signal, and outputs it to the radio transmission unit 51. The output signal from the Inverse Fast Fourier Transform unit 47 is digital/analog converted at the radio transmission unit 51, and, after being up-converted to a frequency suitable for transmission, is transmitted to the base station apparatus A via the antenna.

The reception quality measuring unit 71 measures the reception quality of a signal received from the base station apparatus A. Based on the information measured by the reception quality measuring unit 71, the reception quality information generating unit 67 generates reception quality information to be transmitted to the base station apparatus A.

Figure 2:
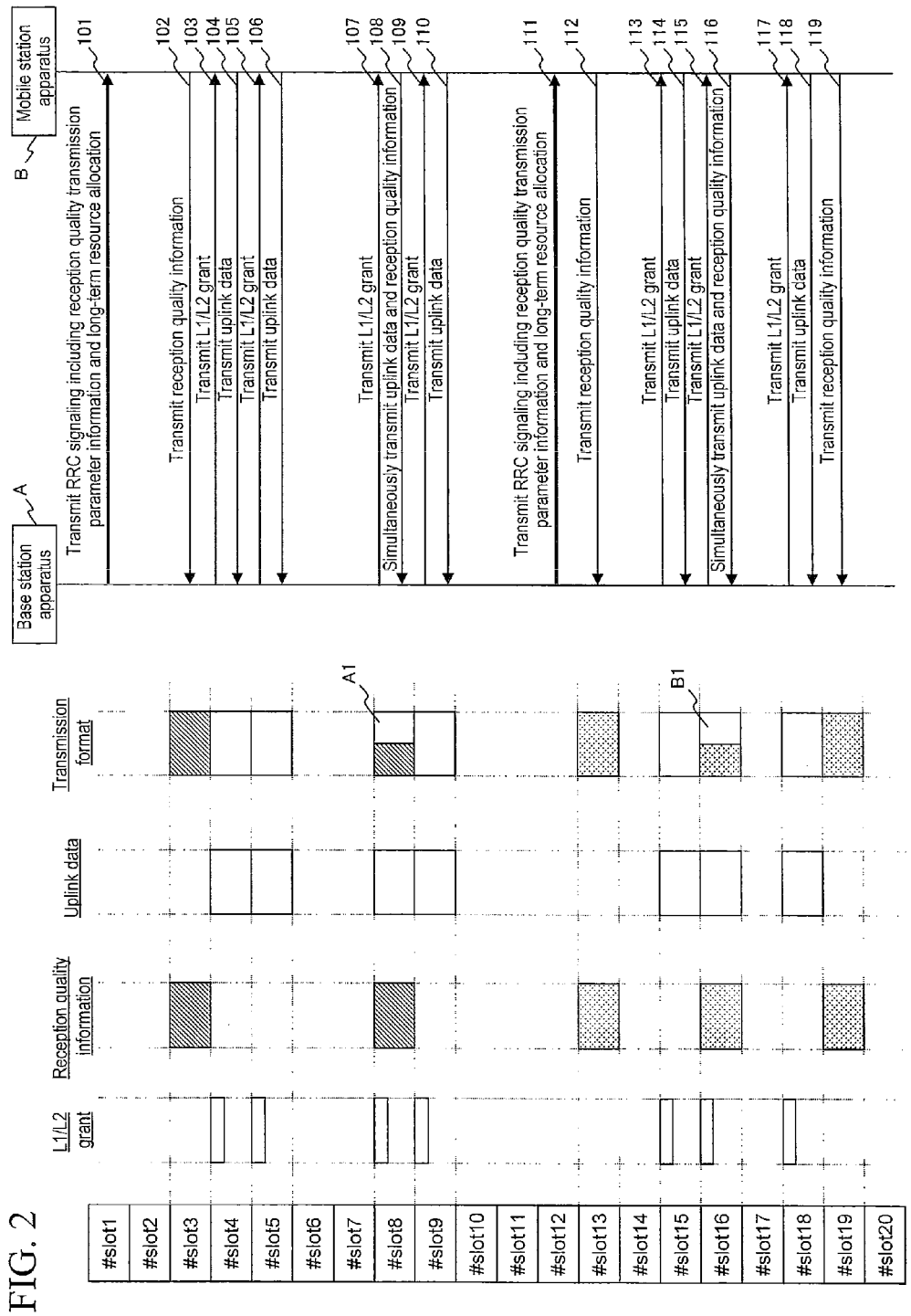
FIG. 2 is a diagram illustrating a process flow according to the first embodiment of the present invention.

FIG. 2 is a diagram showing control signals that are transmitted from the base station apparatus A to the mobile station apparatus B, reception quality information, uplink data that are transmitted from the mobile station apparatus B to the base station apparatus A, and reception quality information transmission format, and the process flow, illustrating a mobile communication system according to the present embodiment. In FIG. 2, by way of example, operations from #slot1 through #slot20 are shown. The diagram on the left and the diagram on the right correspond to each other along the slot axis (vertical axis) direction. In the diagram on the right, the exchanges of reference numerals 101 to 119 are carried out between the base station apparatus A and the mobile station apparatus B. First, the base station apparatus A includes in RRC signaling (Radio Resource Control signaling: radio resource control signal) reception quality parameter information and long-term resource allocation, which are to be used in transmitting the reception quality information, and transmits them to the mobile station apparatus B (101).

The parameters used in transmitting the reception quality information indicate such information as an uplink channel to be used in transmitting the reception quality information such as PUCCH, PUSCH, and the like, a measurement interval for measuring the reception quality information, frequency resolution (frequency granularity) at which the mobile station apparatus B measures the reception quality information, number of streams (RANK) which the mobile station apparatus B is able to receive during MIMO communication, whether it is closed loop or open loop, and the mode during MIMO communication (SU-MIMO, MU-MIMO, and the like). In addition, they also indicate such information as, as will be described later, the ratio (number of OFDM symbols) of the uplink data to the reception quality information that was attempted to be transmitted on the pre-allocated PUSCH resources, and the ratio (number of OFDM symbols) of the uplink data to the reception quality information that was attempted to be transmitted on the pre-allocated PUCCH resources. The long-term resource allocation indicates such information as time resources (transmission slots) for transmitting the reception quality information, and frequency resources for transmitting the reception quality information.

The RRC signaling including the reception quality transmission parameter information and the long-term resource allocation is transmitted from the base station apparatus A (101). Having received that signal, the mobile station apparatus B transmits, based on the information thereof, the reception quality information to the base station apparatus A (102).

In FIG. 2, by way of example, it is shown that, by means of the RRC signaling from the base station apparatus A, the mobile station apparatus B transmits the reception quality information with the time resource that has been set (transmission interval: 5 slots), and using the channel that has been set (for example, PUSCH as indicated with the oblique lines) (102). In addition, it is shown that the RRC signaling is re-transmitted from the base station apparatus A (111), and the reception quality information is transmitted with the transmission interval that has been reset (transmission interval: 3 slots), and using the transmission channel that has been reset (for example, PUCCH as indicated with the crossed lines) (112).

In general, since the resource region of PUSCH is greater than the resource region of PUCCH, the size of the information amount transmitted also becomes larger. Specifically, when requesting the reception quality information of a large information amount with respect to the mobile station apparatus B, the base station apparatus A will set the PUSCH for the channel to be used, and when requesting the reception quality information of a small information amount, it will set the PUCCH for the channel to be used.

Now, operations of #slot8 and #slot16 will be described. #slot 8 and #slot16 are slots that have been set for transmission of the reception quality information by the RRC signaling from the base station apparatus A.

Besides the reception quality information, the mobile station apparatus B also transmits, to the base station apparatus A, the uplink data using the PUSCH in accordance with the resource allocation instructed by means of the downlink control channel (hereinafter PDCCH (Physical Downlink Control Channel)). This downlink control channel (PDCCH) is a signal permitting data transmission with respect to the uplink (L1/L2 grant).

Hereinafter, in the present embodiment, the term L1/L2 grant shall refer to an L1/L2 grant for a grant with respect to the uplink data.

In #slot8 and #slot16, having received the L1/L2 grant (107, 115), the mobile station apparatus B simultaneously transmits, to the base station apparatus A, the uplink data and the reception quality information using the PUSCH resource allocated by the L1/L2 grant (108, 116).

In FIG. 2, it is shown that the L1/L2 grant is transmitted from the base station apparatus A to the mobile station apparatus B using the PDCCH in time with the controlling of #slot8 and #slot16. Having received that signal, the mobile station apparatus B simultaneously transmits, to the base station apparatus A, the uplink data and the reception quality information using the PUSCH.

Now, a description will be provided with respect to a transmission format for when the uplink data and the reception quality information are transmitted simultaneously. The base station apparatus is capable of changing, as the reception information parameter, the physical format for when the mobile station apparatus B simultaneously transmits the uplink data and the reception quality information.

For example, in a case where the data transmitted from the mobile station apparatus B to the base station apparatus A is represented by fourteen OFDM symbols and four OFDM of known reference symbols (pilot signals) used for channel estimation for performing data demodulation are included in those fourteen OFDM symbols, the ratio of the uplink data to the reception quality information within the remaining ten OFDM symbols may be changed as the reception quality information parameter. As an example, of the ten OFDM symbols, the reception quality information may be represented using such a number of OFDM symbols as four OFDM symbols (that is, the uplink data being six OFDM symbols). However, as long as the physical formats of the uplink data and the reception quality information are defined, they may be represented in any given manner.

In this example, the ratio (for example, the number of OFDM symbols) of the uplink data to the reception quality information, which was attempted to be transmitted on the pre-allocated PUSCH resource, can be changed in #slot8, and the ratio (for example, the number of OFDM symbols) of the uplink data to the reception quality information, which was attempted to be transmitted on the pre-allocated PUCCH resource, can be changed in #slot16. These ratios are indicated as the reception information parameters.

Further, operations of the base station apparatus A in #slot8 and #slot16 will be described.

When the mobile station apparatus B simultaneously transmits the uplink data and the reception quality information using the PUSCH resource allocated by the L1/L2 grant, nothing is transmitted on the resources (the PUSCH and the PUCCH resources) pre-allocated by the RRC signaling.

By transmitting the L1/L2 grant (107), the base station apparatus A is able to know in advance that there will be no information to transmit with the resources pre-allocated by the RRC signaling (101), and thus performs such scheduling that other mobile station apparatuses may transmit uplink data and control data (for example, ACK/NACK signals) using these resources.

By performing such scheduling, the resources that had been maintained in advance for the transmission of the reception quality information can be used for other mobile station apparatuses, and the uplink resources can thus be utilized more efficiently.

In FIG. 2, it is shown that uplink data transmission permission signals (the L1/L2 grants) are transmitted from the base station apparatus A to the mobile station apparatus B in #slot4, #slot5, #slot8, #slot9, #slot15, #slot16, and #slot18. In addition, it is shown that, by means of the RRC signaling from the base station apparatus A, #slot3, #slot8, #slot13, #slot16, and #slot19 are allocated as slots for transmitting the reception quality information and that reception quality information is transmitted from the mobile station apparatus B. In addition, it is shown that the uplink data is transmitted from the mobile station apparatus B to the base station apparatus A in the slots corresponding to the uplink data transmission permission signals (the L1/L2 grants) from the base station apparatus A (#slot4, #slot5, #slot8, #slot9, #slot15, #slot16, and #slot18). Further, the transmission format for when the uplink data and the reception quality information are transmitted from the mobile station apparatus B to the base station apparatus A is shown, and, as will be described later, in #slot8 and #slot16, the fact that the uplink data (the rectangles shown in white) and the reception quality information (the rectangles indicated with oblique lines and crossed lines) are simultaneously transmitted to the base station apparatus is conceptually shown by depicting rectangles shown in white and rectangles indicated with oblique lines and crossed lines combined in halves (see reference symbol A1 and B1). Further, the operation in each slot will be described.

In #slot1, the base station apparatus A transmits, to the mobile station apparatus B, the RRC signaling including the reception quality transmission parameter information and long-term resource allocation (101). Here, by way of example, it is assumed that the PUSCH has been allocated as a channel to be used in transmitting the reception quality information and that a five-slot interval (three-slot offset) has been set for the time resource (transmission interval). In addition, in so doing, the base station apparatus A maintains, over an extended period, an uplink channel resource (in this case, PUSCH resource blocks) for transmitting the reception quality information, and has it allocated (granted) to the mobile station apparatus B (referred to as persistent scheduling). In #slot3, the mobile station apparatus B transmits, to the base station apparatus A, the reception quality information using the channel (the PUSCH) that has been set (102). In #slot4, the base station apparatus A transmits the L1/L2 grant (103), and, having received that signal, the mobile station apparatus B transmits the uplink data (104). Similar processes are performed in #slot5 (105, 106), #slot9 and #slot15 (109, 110, 113, 114), and #slot18 (117, 118). In #slot8, the base station apparatus transmits the L1/L2 grant (107), and, having received that signal, the mobile station apparatus simultaneously transmits the uplink data and the reception quality information using the PUSCH resource that has been allocated by means of the L1/L2 grant (108).

In this example, it is assumed that the resource allocations (grants) to data in #slots4, 5, 8, and 9 are performed in one-shot (dynamic scheduling). In #slot8, a persistent grant of the PUSCH for transmitting the reception quality information and a dynamic grant of the PUSCH for transmitting the data would be mixed as shown with the transmission format. However, in such cases, the dynamic grant is given priority, and the reception quality information is combined with the uplink data and transmitted using resources allocated for the uplink data. In addition, in such cases, resources that had been maintained in advance for the reception quality information transmission are opened up to allow other mobile station apparatuses to transmit the uplink data and the control data (for example, ACK/NACK signals).

In #slot12, the base station apparatus A re-transmits, to the mobile station apparatus B, the RRC signaling including the reception quality transmission parameter information (111), and resets the contents and transmission method of the reception quality information. Here, it is assumed that the PUCCH has been allocated as a channel to be used in transmitting the reception quality information, and that a three-slot interval (one-slot offset) has been set for the time resource (transmission interval).

In #slot13, the mobile station apparatus B transmits, to the base station apparatus A, the reception quality information using the channel (the PUCCH) that has been set (112). A similar process is performed in #slot19 (119). In #slot16, the base station apparatus A transmits the L1/L2 grant (115), and, having received that signal, the mobile station apparatus B simultaneously transmits the uplink data and the reception quality information using the PUSCH resource that has been allocated by means of the L1/L2 grant (116). In other words, the reception quality information that was attempted to be transmitted using the PUCCH resource as assigned by the RRC signaling would be transmitted simultaneously with the uplink data using the PUSCH.

Here, the reception quality transmission parameter information that is transmitted from the base station apparatus to the mobile station apparatus can be transmitted by being included in the L1/L2 signaling in the downlink. By transmitting the reception quality transmission parameter information by including it in the L1/L2 signaling, it can be transmitted to the mobile station apparatus immediately.

According to the first embodiment of the present invention, by having the base station apparatus transmit, to the mobile station apparatus B, the reception quality transmission parameter information, which is to be used in transmitting the reception quality information, and long-term resource allocation by including them in the RRC signaling, parameters that are to be used in transmitting the reception quality information can be controlled by the base station apparatus A. Thus, such parameter setting for the reception quality information transmission that flexibly adapts to changes in the information amount and degree of transmission frequency of the reception quality information can be performed, thereby making it possible to realize efficient transmission control.

Second Embodiment

Figure 3:
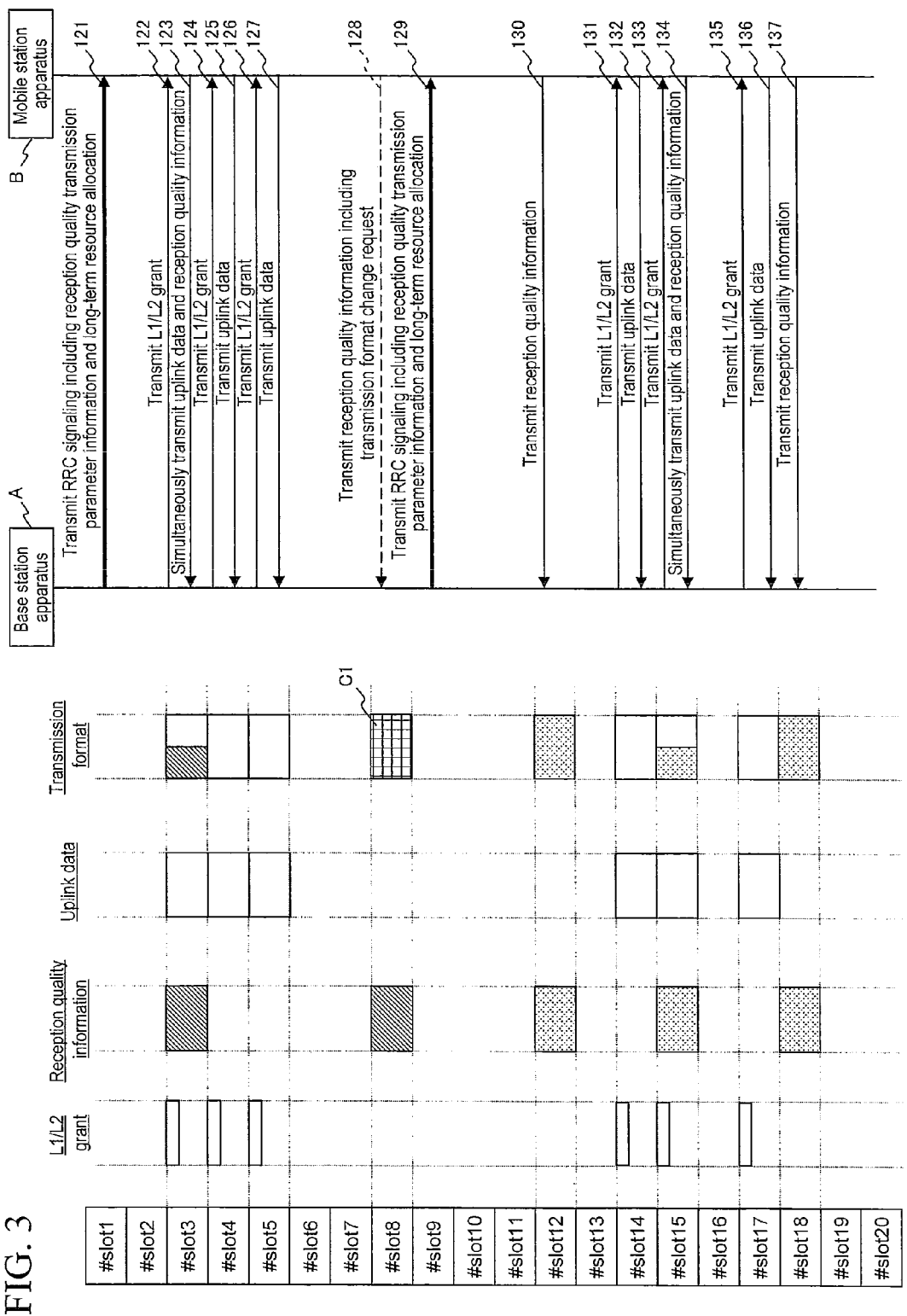
FIG. 3 is a diagram illustrating a process flow according to the second embodiment of the present invention.

Next, a mobile communication system according to the second embodiment of the present invention will be described with reference to the drawings. FIG. 3 is a process flow in a mobile communication system according to the second embodiment of the present invention. In FIG. 3, there are shown control signals that are transmitted from the base station apparatus to the mobile station apparatus, the reception quality information, the uplink data that are transmitted from the mobile station apparatus to the base station apparatus, and the reception quality information transmission format, and the process flow. By way of example, operations from #slot1 to #slot20 are shown.

A difference between the present embodiment and the first embodiment is the fact that, in #slot8, the mobile station apparatus B transmits, to the base station apparatus A, the reception quality information including a transmission format change request (128). Operations (121 to 137) performed in all other slots are similar to those in the first embodiment.

In FIG. 3, as will be described later, it is shown that, as the transmission format of the reception quality information transmitted from the mobile station apparatus B to the base station apparatus A, the reception quality information including the transmission format change request is transmitted in #slot8 (C1). The other L1/L2 grants, the reception quality information, the uplink data, and the transmission formats are also shown conceptually as were described in embodiment 1.

The operation in each slot will be described.

In #slot8, the mobile station apparatus B transmits, to the base station apparatus A, the reception quality information including the transmission format change request. This transmission format change request is information that is added when the mobile station apparatus B determines that it wishes to change the parameters to be used in transmitting the reception quality information. This determination occurs when, for example, changes occur in downlink data channel conditions resulting from changes in the movement speed and reception conditions of a terminal and the like.

Having received from the mobile station apparatus B the reception quality information including the transmission format change request, the base station apparatus A, taking into consideration the uplink resources within the cell that it controls, transmits the reception quality parameter information by including it in the RRC signaling (129), and thus resets the parameters.

As described up to this point, the parameters to be used in transmitting the reception quality information should be controlled by the base station apparatus A. Therefore, for example, even if the transmission format change request demanding frequent transmission of the reception quality information of a large information amount were included in the reception quality information and transmitted from the mobile station apparatus B, if the base station apparatus A determines that there would not be enough uplink resources within the cell that it controls, it need not accept that transmission format change request. If the base station apparatus A does not accept the transmission format change request, either nothing is transmitted, or the RRC signaling including the same reception quality transmission parameter information as before is transmitted to the mobile station apparatus B.

Details of the process flow will be described. As for the respective slots other than #slot8, it is noted that processes similar to the processes described in the first embodiment may be performed.

In #slot8, having determined, from changes in the channel conditions for downlink data and the like, that it wishes to change the parameters to be used in transmitting the reception quality information, the mobile station apparatus B transmits, to the base station apparatus A, the reception quality information including the transmission format change request (128). Having received that signal, the base station apparatus A, taking into consideration the uplink resources within the cell that it controls, transmits the reception quality parameter information by including it in the RRC signaling (129), and thus resets the parameters. In so doing, if it determines that there would not be enough uplink resources within the cell that it controls, it will not accept the transmission format request from the mobile station apparatus B.

Here (128), this transmission format change request can also be transmitted by being included in the uplink L1/L2 signaling or the RRC signaling from the mobile station apparatus to the base station apparatus instead of including it in the reception quality information. By transmitting it by including it in the L1/L2 signaling, it is possible to transmit the transmission format change request to the base station apparatus immediately. In addition, by transmitting it by including it in the RRC signaling, it is possible to transmit the transmission format change request to the base station apparatus with better certainty.

In addition, as was described in the first embodiment, the reception quality transmission parameter information that is transmitted from the base station apparatus to the mobile station apparatus (121, 129) can also be transmitted by being included in the L1/L2 signaling in the downlink. By transmitting the reception quality transmission parameter information by including it in the L1/L2 signaling, it is possible to transmit it to the mobile station apparatus immediately. Further, the fact that the reception quality transmission parameter information from the base station apparatus to the mobile station has been changed need not be explicitly transmitted using signaling, and can also be identified through scheduling information included in control signals of downlink data (for example, MIMO information included in control signals of downlink data and the like).

As described above, according to the second embodiment of the present invention, there is an advantage in that, by having the mobile station apparatus, which has determined that it wishes to change the parameters to be used in transmitting the reception quality information, transmit, to the base station apparatus, the reception quality information that includes the transmission format change request, efficient transmission control that adapts to changes in the information amount and degree of transmission frequency of the reception quality information caused by changes in the conditions of the mobile station apparatus can be realized.

Third Embodiment

Figure 4:
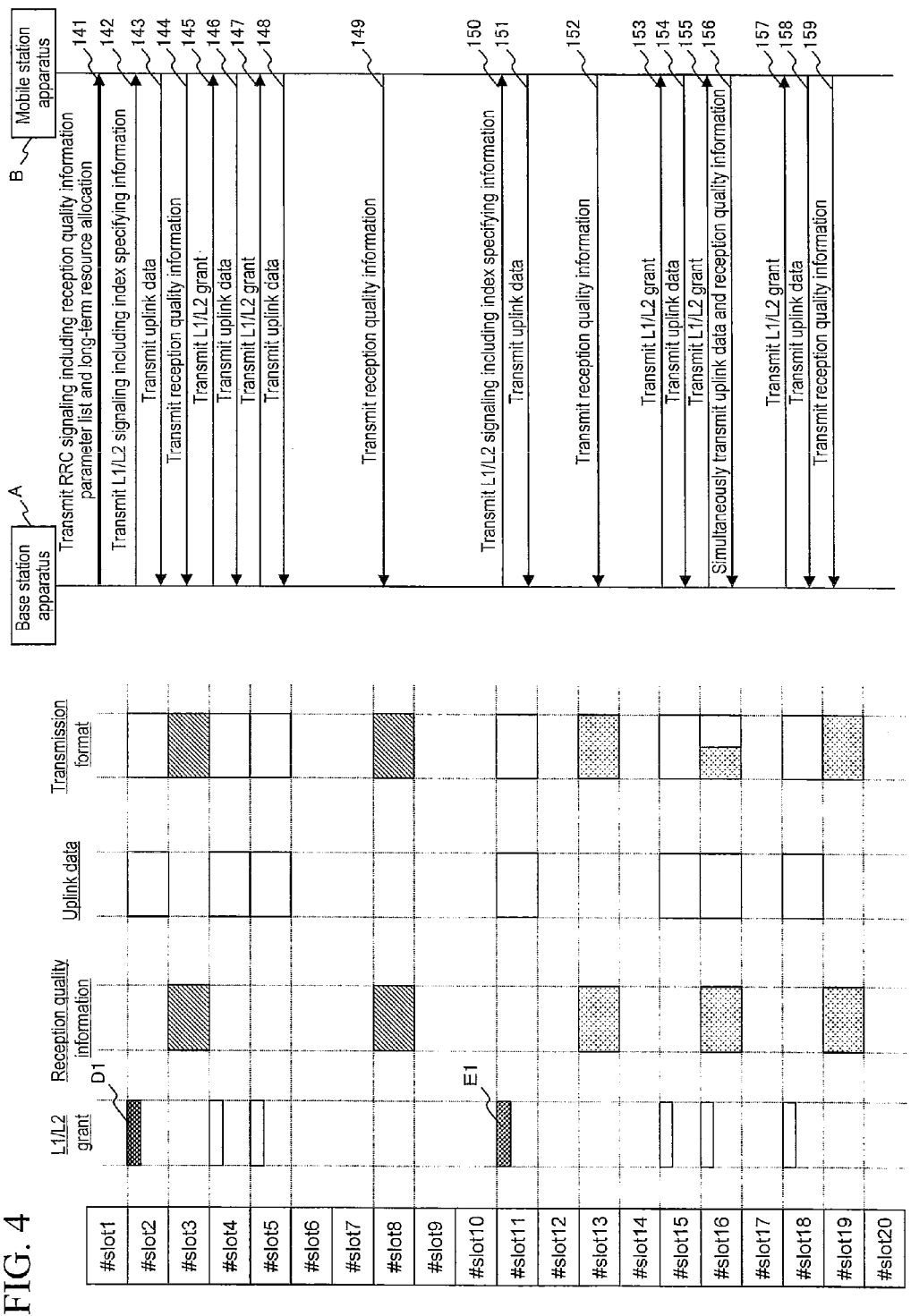
FIG. 4 is a diagram illustrating a process flow according to the third embodiment of the present invention.

Next, the third embodiment of the present invention will be described with reference to the drawings. FIG. 4 is a diagram showing control signals transmitted from the base station apparatus to the mobile station apparatus, the reception quality information, the uplink data that are transmitted from the mobile station apparatus to the base station apparatus, and the reception quality information transmission formats, and the process flow in a mobile communication system according to the third embodiment of the present invention.

A significant difference from the process flow shown in FIG. 2 is the fact that, in #slot1, the base station apparatus A transmits, to the mobile station apparatus B, the RRC signaling including a reception quality information parameter list and long-term resource allocation (141). In addition, there is the fact that, in #slot2 and #slot11, the base station apparatus A transmits, to the mobile station apparatus, the L1/L2 signaling including index specifying information (142, 150). In general, of the signals exchanged between the base station apparatus A and the mobile station apparatus B, the transmission of the L1/L2 signaling can be carried out more immediately than the transmission of the RRC signaling. In other words, by having the base station apparatus A control, the mobile station apparatus B, using the L1/L2 signaling, the parameters that are to be used in transmitting the reception quality information can be set more frequently.

As will be described later, in FIG. 4, it is shown that L1/L2 grants including index specifying information are transmitted from the base station apparatus A to the mobile station apparatus B in #slot2 and #slot11 (see reference symbols D1 and E1). The other L1/L2 grants, the reception quality information, the uplink data, and the transmission formats are also shown conceptually as were described in embodiment 1.

The operation in each slot will be described.

First, the operation of the base station apparatus A in #slot1 will be described. In #slot1, the base station apparatus A transmits, to the mobile station apparatus B, the RRC signaling including a reception quality information parameter list and long-term resource allocation. Here, the term reception quality information parameter list refers to a list on which are listed a plurality of combinations of parameters to be used in transmitting the reception quality information.

FIG. 5 is a diagram showing one configuration example of the reception quality information parameter list. As shown in FIG. 5, the reception quality information parameter list includes the transmission channel to be used in transmitting the reception quality information (for example, the PUCCH or the PUSCH), the ratio (number of OFDM symbols) of the uplink data to the reception quality information, which was attempted to be transmitted on the PUSCH resources, when they are transmitted simultaneously, the ratio (number of OFDM symbols) of the uplink data to the reception quality information, which was attempted to be transmitted on the PUCCH resources, when they are transmitted simultaneously, measurement interval for measuring the reception quality information (for example, measurement interval: 3, 5, 10, 20, 50, 100 slots), frequency resolution at which the mobile station apparatus measures the reception quality information (for example, frequency granularity: 25 resource blocks, 50 resource blocks, Full (all frequency bands), 5 resource blocks, 10 resource blocks, 20 resource blocks), the number of streams the mobile station apparatus B is able to receive during MIMO communications (for example, one of RANK 1, 2 and 4), information as to whether it is open-loop or closed-loop, and information on MIMO mode (for example, Tx Diversity, SU-MIMO, MU-MIMO, and the like). In the reception quality information parameter list, indices (1 to 6 in FIG. 5) are assigned to the respective combinations of these parameters.

Returning to FIG. 4, the operation of the base station apparatus in #slot2 will be described. In #slot2, the base station apparatus A transmits, to the mobile station apparatus B, the L1/L2 signaling including index specifying information (142). Here, the term index specifying information refers to information specifying one parameter combination from among the plurality of combinations of the reception quality parameter information listed on the reception quality information parameter list.

Having received the L1/L2 signaling including the index specifying information in #slot2, the mobile station apparatus B transmits the reception quality information with the parameters corresponding to the specified index (for example, index 1) (144). Similarly in #slot11, the L1/L2 signaling including the index specifying information is transmitted from the base station apparatus A (150), and the mobile station apparatus B, having received this signal, transmits the reception quality information with the parameters corresponding to the index that has been set (for example, index 5) (151).

Here, this index specifying information can also be included in the RRC signaling that is transmitted in #slot1. By including the index specifying information in the RRC signaling transmitted in #slot1, it is possible to omit the specifying of an index that is initially performed through the L1/L2 signaling (performed in #slot2 in this example). Thus, the transmission of the reception quality information parameter list and the specifying of an index can be performed with the RRC signaling alone.

In addition, the reception quality information parameter list shown in FIG. 5 can also be predefined through specifications and the like. By predefining the reception quality information parameter list and having it known among the base station apparatus and the mobile station apparatus, it becomes unnecessary to transmit it by including it in the RRC signaling. Thus, the specifying of an index can be carried out by simply transmitting the L1/L2 signaling including an index specification. It is noted that "predefined" is to mean "defined by means of specifications," that is, it is to mean that the contents of the parameter list are defined and become known among all base stations and mobile station apparatuses. It is to mean that the parameter list is defined by means of specifications, and that the defined contents are pre-stored in the memories and the like of base station apparatuses and mobile station apparatuses."

As indicated above, according to the present embodiment, the base station apparatus A transmits the RRC signaling including the reception quality information parameter list, and further transmits the L1/L2 signaling including the index specifying information specifying an index from the reception quality information parameter list. Having received that signal, the mobile station apparatus B transmits, to the base station apparatus A, the reception quality information with the parameters corresponding to the specified index. Thus, it is possible to frequently and immediately change the parameters for transmitting the reception quality information.

Consequently, there are advantages in that the setting of parameters for reception quality information transmission that flexibly adapts to changes in the information amount and degree of transmission frequency of the reception quality information can be performed, and efficient transmission control can thus be realized.

Fourth Embodiment

FIG. 6 shows control signals transmitted from the base station apparatus to the mobile station apparatus, the reception quality information, the uplink data that are transmitted from the mobile station apparatus to the base station apparatus, and the reception quality information transmission formats, and the process flow in a mobile station communication system according to the fourth embodiment of the present invention.

A significant difference from FIG. 4 of the third embodiment is the fact that, in #slot8, the mobile station apparatus B transmits, to the base station apparatus A, the reception quality information including an index change request (169). Operations performed in all other slots are as described in the third embodiment.

As will be described later, in FIG. 6, it is shown that, as the transmission format of the reception quality information that is transmitted from the mobile station apparatus B to the base station apparatus A in #slot8, the reception quality information including an index change request is transmitted (see reference symbol F1). The other L1/L2 grants, the reception quality information, the uplink data, and the transmission formats are also shown conceptually as described in embodiment 1 and embodiment 3.

Each slot will be described in detail.

In #slot8, the mobile station apparatus B transmits, to the base station apparatus A, the reception quality information including an index change request. This index change request is information that is added when the mobile station apparatus B determines that it wishes to change the parameters specified by the index specifying information. This determination is performed when, for example, changes have occurred in the channel conditions for downlink data caused by changes in the movement speed or reception conditions of a terminal and the like.

Having received from the mobile station apparatus B the reception quality information including the index change request, the base station apparatus A, taking into consideration the uplink resources within the cell that it controls, transmits the index specifying information by including it in the L1/L2 signaling (170), and thus resets the index.

As was described in the second embodiment above, the parameters to be used in transmitting the reception quality information should be controlled by the base station apparatus A. Therefore, for example, even if the index change request demanding frequent transmission of the reception quality information of a large information amount were included in the reception quality information and transmitted from the mobile station apparatus B, if the base station apparatus A were to determine that there would not be enough uplink resources within the cell that it controls, it need not accept that index change request. If the base station apparatus A does not accept the index change request, either nothing is transmitted, or the L1/L2 signaling including the same index information as before is transmitted to the mobile station apparatus B.

As for the respective slots in FIG. 6 other than #slot8, similar processes as the processes that were described with FIG. 4 are performed. In #slot8, having determined, due to changes in the channel conditions for downlink data and the like, that it wishes to change the index that is set, the mobile station apparatus B transmits, to the base station apparatus A, the reception quality information including the index change request (169). Having received that signal, the base station apparatus A, taking into consideration the uplink resources within the cell that it controls, transmits index specifying information by including it in the L1/L2 signaling (170), and thus resets the parameters to be used. In so doing, if it determines that there would not be enough uplink resources within the cell that it controls, it will not accept the index change request from the mobile station apparatus B.

Here, instead of including it in the reception quality information, this index change request 169 can be transmitted by being included in the L1/L2 signaling in the uplink or the RRC signaling from the mobile station apparatus to the base station apparatus. By transmitting it by including it in the L1/L2 signaling, it is possible to immediately transmit the index change request to the base station apparatus. In addition, by transmitting it by including it in the RRC signaling, it is possible to transmit the index change request to the base station apparatus with better certainty.

According to the present embodiment, by having the mobile station apparatus, which has determined that it wishes to change the reception information parameter list index to be used in transmitting the reception quality information, transmit, to the base station apparatus, the reception quality information including the index change request, it is possible to realize efficient transmission control that adapts to changes in the information amount and degree of transmission frequency of the reception quality information caused by changes in the conditions of the mobile station apparatus and the like.

According to an aspect of the present invention, there is provided a mobile communication system in which a mobile station apparatus transmits reception quality information, which indicates the quality of a signal received from a base station apparatus, to the base station apparatus, wherein the base station apparatus performs periodic allocation of physical uplink shared channel on which the mobile station apparatus is to transmit reception quality information, and the mobile station apparatus periodically transmits, to the base station apparatus, reception quality information on the allocated physical uplink shared channel. It is preferable that the base station apparatus transmits, by including it in a radio resource control signal, the periodic allocation of physical uplink shared channel on which the mobile station apparatus is to transmit reception quality information, and the mobile station apparatus periodically transmits, to the base station apparatus, reception quality information on physical uplink shared channel allocated by the radio resource control signal. The mobile communication system may also be configured such that the base station apparatus transmits, by including them in a radio resource control signal, transmission interval and offset of physical uplink shared channel on which the mobile station apparatus is to transmit reception quality information, and the mobile station apparatus periodically transmits, to the base station apparatus, reception quality information with transmission interval and offset that have been set by the radio resource control signal. In addition, the base station device may transmit a radio resource control signal, which instructs periodic transmission of reception quality information on physical uplink shared channel, and an uplink data transmission permission signal, which instructs transmission of uplink data, and the mobile station apparatus simultaneously transmits, to the base station apparatus, reception quality information and uplink data together in accordance with uplink data transmission permission in case that periodic transmission of reception quality information on physical uplink shared channel in accordance with the radio resource control signal and transmission of uplink data in accordance with uplink data transmission permission signal would occur at the same time. In addition, the base station device may perform periodic allocation of physical uplink shared channel and physical uplink control channel on which the mobile station apparatus is to transmit reception quality information, and the mobile station apparatus periodically transmits, to the base station apparatus, reception quality information on the allocated physical uplink shared channel and physical uplink control channel.

The base station device may transmit, by including it in a radio resource control signal, periodic allocation of the physical uplink shared channel and physical uplink control channel on which the mobile station apparatus is to transmit reception quality information, and the mobile station apparatus periodically transmits, to the base station apparatus, reception quality information on physical uplink shared channel and physical uplink control channel that have been allocated by the radio resource control signal. The base station device may transmit, by including them in a radio resource control signal, transmission interval and offset of physical uplink shared channel and transmission interval and offset of the physical uplink control channel, on which the mobile station apparatus is to transmit reception quality information, and the mobile station apparatus periodically transmits, to the base station apparatus, reception quality information with transmission intervals and offsets including in the radio resource control signal.

In addition, the present invention may also be a base station apparatus that controls, with respect to a mobile station apparatus, transmission of reception quality information, the base station apparatus comprising: a scheduler unit that performs periodic allocation of physical uplink shared channel on which reception quality information is to be transmitted. It is preferable that the base station apparatus comprises: the scheduler unit that includes in a radio resource control signal periodic allocation of physical uplink shared channel on which the mobile station apparatus is to transmit reception quality information; and a radio transmission unit that transmits, to the mobile station apparatus, the radio resource control signal including periodic allocation of physical uplink shared channel. It is preferable that the base station apparatus comprises: the scheduler unit that includes in a radio resource control signal transmission interval and offset of physical uplink shared channel on which the mobile station apparatus is to transmit reception quality information; and the radio transmission unit that transmits, to the mobile station apparatus, the radio resource control signal including transmission interval and offset.

In addition, the present invention may also be a mobile station apparatus comprising: a radio transmission unit that periodically transmits, to the base station apparatus, reception quality information on physical uplink shared channel that is allocated by the base station apparatus. It is preferable that the mobile station apparatus comprises: a radio reception unit that receives, from the base station apparatus, a radio resource control signal including periodic allocation of physical uplink shared channel on which reception quality information is to be transmitted; and the radio transmission unit that periodically transmits, to the base station apparatus, reception quality information on physical uplink shared channel that is allocated by the radio resource control signal.

It is preferable that the mobile station apparatus comprises: the radio reception unit that receives, from the base station apparatus, a radio resource control signal including transmission interval and offset of physical uplink shared channel on which reception quality information is to be transmitted; and the radio transmission unit that periodically transmits, to the base station apparatus, reception quality information with transmission interval and offset that have been set by the radio resource control signal.

The mobile station apparatus being characterized by: the radio reception unit that receives a radio resource control signal, which instructs periodic transmission of reception quality information on physical uplink shared channel, and an uplink data transmission permission signal, which instructs transmission of uplink data; and the radio transmission unit that simultaneously transmits, to the base station apparatus, reception quality information and uplink data in accordance with uplink data transmission permission in case that periodic transmission of reception quality information on physical uplink shared channel in accordance with the radio resource control signal and transmission of uplink data in accordance with uplink data transmission permission signal would occur at the same time.

It is preferably a base station apparatus that controls, with respect to the mobile station apparatus, transmission of reception quality information, wherein the base station apparatus comprises: the scheduler unit that performs periodic allocation of physical uplink shared channel and physical uplink control channel on which reception quality information is to be transmitted. In addition, it is preferable that the base station apparatus comprises: the scheduler unit that includes in a radio resource control signal periodic allocation of physical uplink shared channel and physical uplink control channel on which the mobile station apparatus is to transmit reception quality information; and a radio transmission unit that transmits, to the mobile station apparatus, the radio resource control signal including allocation of physical uplink shared channel and physical uplink control channel.

The base station apparatus may also comprises: the scheduler unit that includes in radio resource control signal transmission interval and offset of physical uplink shared channel and transmission interval and offset of physical uplink control channel, on which the mobile station apparatus is to transmit reception quality information, and the radio transmission unit that transmits, to the mobile station apparatus, the radio resource control signal including transmission interval and offset of physical uplink shared channel and transmission interval and offset of physical uplink control channel.

In addition, the present invention may be a mobile station apparatus transmits reception quality information to the base station apparatus, wherein the mobile station apparatus comprises: a radio reception unit that receives, from the base station apparatus, a radio resource control signal including periodic allocation of physical uplink shared channel and physical uplink control channel on which reception quality information is to be transmitted; and the radio transmission unit that periodically transmits, to the base station apparatus, reception quality information on physical uplink shared channel and physical uplink control channel that have been allocated by the radio resource control signal. It is preferable that the mobile station apparatus comprises: the radio reception unit that receives, from the base station apparatus, a radio resource control signal including transmission interval and offset of physical uplink shared channel and transmission interval and offset of physical uplink control channel, on which reception quality information is to be transmitted, and the radio transmission unit that periodically transmits, to the base station apparatus, reception quality information with transmission interval and offset of physical uplink shared channel and transmission interval and offset of physical uplink control channel that have been set by the radio resource control signal.

The present invention may be a mobile communication method using a base station apparatus and a mobile station apparatus, wherein the base station apparatus executes a process of performing periodic allocation of physical uplink shared channel on which the mobile station apparatus is to transmit reception quality information, and the mobile station apparatus executes a process of periodically transmitting, to the base station apparatus, reception quality information on the allocated physical uplink shared channel.

In addition, it may be a mobile communication method using the base station apparatus and the mobile station apparatus, wherein the base station apparatus executes a process of transmitting to the mobile station apparatus, by including it in a radio resource control signal, periodic allocation of physical uplink shared channel on which the mobile station apparatus is to transmit reception quality information, and the mobile station apparatus executes a process of periodically transmitting, to the base station apparatus, reception quality information on physical uplink shared channel that has been allocated by the radio resource control signal. The base station apparatus executes a process of transmitting to the mobile station apparatus, by including them in the radio resource signal, transmission interval and offset of physical uplink shared channel on which the mobile station apparatus is to transmit reception quality information, and the mobile station apparatus executes a process of periodically transmitting, to the base station apparatus, reception quality information with transmission interval and offset that have been set by the radio resource control signal.

It may be characterized in that the base station apparatus executes a process of transmitting a radio resource control signal, which instructs periodic transmission of reception quality information on physical uplink shared channel, and an uplink data transmission permission signal, which instructs transmission of uplink data, and the mobile station apparatus executes a process of simultaneously transmitting, to the base station apparatus, reception quality information and uplink data in accordance with uplink data transmission permission in case that periodic transmission of reception quality information on physical uplink shared channel in accordance with the radio resource control signal and transmission of uplink data in accordance with uplink data transmission permission signal would occur at the same time. It is preferable that the base station apparatus executes a process of performing periodic allocation of physical uplink shared channel and physical uplink control channel on which the mobile station apparatus is to transmit reception quality information, and the mobile station apparatus executes a process of periodically transmitting, to the base station, reception quality information apparatus on the allocated physical uplink shared channel and physical uplink control channel. In addition, it is preferable that the base station apparatus executes a process of transmitting, by including it in a radio resource control signal, periodic allocation of physical uplink shared channel and physical uplink control channel on which the mobile station apparatus is to transmit reception quality information, and the mobile station apparatus executes a process of periodically transmitting, to the base station apparatus, reception quality information on physical uplink shared channel and physical uplink control channel that have been allocated by the radio resource control signal.

In addition, the present invention may be a mobile communication system in which a mobile station apparatus measures reception quality of a signal received from a base station apparatus and transmits reception quality information to the base station apparatus, wherein the mobile station apparatus transmits to the base station apparatus, by including it in reception quality information, a transmission format change request requesting a change in parameter information that is to be used in transmitting reception quality information, and the base station apparatus sets parameter information to be used for the mobile station apparatus to transmit reception quality information in case that reception quality information including the transmission format change request is received.

Further, it may be a mobile station apparatus that measures reception quality of a signal received from a base station apparatus and transmits reception quality information to the base station apparatus, the mobile station apparatus comprising: a radio reception unit that receives, from the base station apparatus, parameter information to be used in transmitting reception quality information; and a radio transmission unit that transmits, to the base station apparatus, reception quality information including a transmission format change request requesting a change in the parameter information.

In addition, it may be a base station apparatus that controls, with respect to a mobile station apparatus, an operation of transmitting reception quality information, the base station apparatus comprising: a radio reception unit that receives a transmission format change request requesting a change in parameter information to be used by the mobile station apparatus in transmitting reception quality information; and a radio transmission unit that transmits, in case that the transmission format change request is received, a signal that sets parameter information to be used by the mobile station apparatus in transmitting reception quality information.

In addition, it may also be a mobile communication method using a base station apparatus and a mobile station apparatus, wherein the mobile station apparatus executes a process of transmitting to the base station apparatus, by including it in reception quality information, a transmission format change request requesting a change in parameter information to be used in transmitting reception quality information, and the base station apparatus executes, in case that the transmission format change request is received, a process of setting parameter information to be used by the mobile station apparatus in transmitting reception quality information.

It may also be a mobile communication system in which a mobile station apparatus measures reception quality of a signal received from a base station apparatus and transmits reception quality information to the base station apparatus, wherein the base station apparatus transmits, by including it in a radio resource control signal, a reception quality information parameter list listing a plurality of pieces of parameter information that are to be used by the mobile station apparatus in transmitting reception quality information, and thereafter transmits, by including it in an uplink data transmission permission signal, index specifying information specifying one piece of parameter information from among the reception quality information parameter list, and the mobile station apparatus transmits, to the base station apparatus, reception quality information using parameter information specified by the index specifying information.

It may also be a base station apparatus that controls, with respect to a mobile station apparatus, an operation of transmitting reception quality information, wherein the base station apparatus comprises: a radio transmission unit that transmits, by including it in a radio resource control signal, a reception quality information parameter list listing a plurality of pieces of parameter information that are to be used by the mobile station apparatus in transmitting reception quality information, and thereafter transmits, by including it in an uplink data transmission permission signal, index specifying information specifying one piece of parameter information from among the reception quality information parameter list.

It may also be a mobile station apparatus that measures reception quality of a signal received from a base station apparatus and transmits reception quality information to the base station apparatus, the mobile station apparatus comprising: a radio reception unit that receives a radio resource control signal including a reception quality information parameter list listing a plurality of pieces of parameter information to be used in transmitting reception quality information, and thereafter receives an uplink data transmission permission signal including index specifying information specifying one piece of parameter information from among the reception quality information parameter list; and a radio transmission unit that transmits, to the base station apparatus, reception quality information using parameter information specified by the index specifying information.

It may be a mobile communication method using a base station apparatus and a mobile station apparatus, wherein the base station apparatus executes a process of transmitting, by including it in a radio resource control signal, a reception quality information parameter list listing a plurality of pieces of parameter information to be used by the mobile station apparatus in transmitting reception quality information, and of thereafter transmitting, by including it in an uplink data transmission permission signal, index specifying information specifying one piece of parameter information from among the reception quality information parameter list, and the mobile station apparatus executes a process of transmitting, to the base station apparatus, reception quality information using parameter information specified by the index specifying information.

In addition, it may be a mobile communication system in which a mobile station apparatus measures reception quality of a signal received from a base station apparatus and transmits reception quality information to the base station apparatus, wherein the mobile station apparatus transmits to the base station apparatus, by including it in reception quality information, an index change request requesting a change in parameter information that has been specified by index specifying information specifying one piece of parameter information from among a reception quality information parameter list listing a plurality of pieces of parameter information to be used in transmitting reception quality information, and the base station apparatus transmits, in case that reception quality information including the index change request is received, the index specifying information and sets the parameter information to be used by the mobile station apparatus in transmitting reception quality information.

It may also be a mobile station apparatus that measures reception quality of a signal received from a base station apparatus and transmits reception quality information to the base station apparatus, the mobile station apparatus comprising: a radio reception unit that receives a radio resource control signal including a reception quality information parameter list listing a plurality of pieces of parameter information to be used in transmitting reception quality information, and thereafter receives an uplink data transmission permission signal including index specifying information specifying one piece of parameter information from among the reception quality information parameter list; and a radio transmission unit that transmits to the base station apparatus, by including it in reception quality information, an index change request requesting a change in parameter information specified by the index specifying information.

It may also be a base station apparatus that controls, with respect to a mobile station apparatus, an operation of transmitting reception quality information, the base station apparatus comprising: a radio transmission unit which, in case that reception quality information including an index change request requesting a change in parameter information that has been specified by index specifying information specifying one piece of parameter information from among a reception quality information parameter list listing a plurality of pieces of parameter information to be used in transmitting reception quality information is received, transmits, by including it in an uplink data transmission permission signal, the index specifying information specifying one piece of parameter information from among the reception quality information parameter list. In addition, it may also be a mobile communication method using a base station apparatus and a mobile station apparatus, wherein the mobile station apparatus executes a process of transmitting to the base station apparatus, by including it in reception quality information, an index change request requesting a change in parameter information that has been specified by index specifying information specifying one piece of parameter information from among a reception quality information parameter list listing a plurality of pieces of parameter information to be used in transmitting the reception quality information, and the base station apparatus executes, in case that reception quality information including the index change request is received, a process of transmitting the index specifying information and setting the parameter information that is to be used by the mobile station apparatus in transmitting reception quality information.

Although embodiments of the present invention have been described in detail above with reference to the drawings, specific configurations are by no means limited to these embodiments, and designs and the like that do not depart from the spirit and scope of this invention are to be included in the scope of claims.

INDUSTRIAL APPLICABILITY

The present invention is applicable in mobile communication systems.

The invention claimed is:
1. A mobile communication system in which a mobile station apparatus transmits uplink data to a base station apparatus using a physical uplink shared channel that is allocation by an uplink data transmission permission signal, the mobile communication system comprising:

the base station apparatus
allocates, to the mobile station apparatus, by using a radio resource control signal, a physical uplink control channel for the mobile station apparatus to transmit channel states information,
allocates, to the mobile station apparatus, by using the radio resource control signal, the physical uplink shared channel for the mobile station apparatus to transmit the channel state information,
the mobile station apparatus
periodically transmits, to the base station apparatus, the channel states information using the physical uplink control channel in case that the physical uplink control channel has been allocated, and
periodically transmits, to the base station apparatus, the channel states information using the physical uplink shared channel in case that the physical uplink shared channel has been allocated.

2. A mobile communication system in which a mobile station apparatus transmits uplink data to a base station apparatus using a physical uplink shared channel that is allocated by an uplink data transmission permission signal, the mobile communication system comprising:

the base station apparatus
transmits, to the mobile station apparatus, a radio resource control signal including a first transmission interval for the mobile station apparatus to channel states information using the physical uplink shared channel,
transmits, to the mobile station apparatus, the uplink data transmission permission signal including information that sets the fact that the channel states information is to be transmitted using the physical uplink shared channel, and
the mobile station apparatus
periodically transmits, to the base station apparatus, the channel states information using the physical uplink shared channel in accordance with the first transmission interval, in case that it has been set that the channel states information is to be transmitted using the physical uplink shared channel.

3. The mobile communication system according to claim 2, wherein the base station apparatus
transmits, to the mobile station apparatus, the radio resource control signal including a second transmission interval for the mobile station apparatus to transmit the channel states information using a physical uplink control channel,
the mobile station apparatus
periodically transmits, to the base station apparatus, the channel states information using the physical uplink control channel in accordance with the second transmission interval, and
periodically transmits, to the base station apparatus, the channel states information using the physical uplink shared channel in accordance with the first transmission interval, in case that it has been set that the channel states information is to be transmitted using the physical uplink shared channel.

4. A mobile communication system in which a mobile station apparatus transmits uplink data to a base station apparatus using a physical uplink shared channel that is allocated by an uplink data transmission permission signal, the mobile communication system comprising:

the base station apparatus
transmits, to the mobile station apparatus, a radio resource control signal including a transmission interval for the mobile station apparatus to transmit channel states information using first resources of the physical uplink shared channel,
transmits, to the mobile station apparatus, the uplink data transmission permission signal,
the mobile station apparatus
periodically transmits, to the base station apparatus, the channel states information using the first resources of the physical uplink shared channel in accordance with the transmission interval, and
transmits, to the base station apparatus, the channel states information using second resources of the physical uplink shared channel that is allocation by the uplink data transmission permission signal, in case that the second resources of the physical uplink shared channel have been allocated by the uplink data transmission permission signal in transmitting the channel states information using the first resources of the physical uplink shared channel.

5. A base station apparatus in a mobile communication system in which a mobile station apparatus transmits uplink data to a base station apparatus using a physical uplink shared channel that is allocated by an uplink data transmission permission signal, the base station apparatus comprising:

a transmitting unit which transmits, to the mobile station apparatus, a radio resource control signal including a transmission interval for the mobile station apparatus to transmit channel states information using the physical uplink shared channel, and
the transmitting unit which transmits, to the mobile station apparatus, the uplink data transmission permission signal including information that sets the fact that the channel states information is to be transmitted using the physical uplink shared channel.

6. A mobile station apparatus in a mobile communication system in which the mobile station apparatus transmits uplink data to a base station apparatus using a physical uplink shared channel that is allocated by an uplink data transmission permission signal, the mobile station apparatus comprises:

a receiving unit which receives, from the base station apparatus, a radio resource control signal that allocates a physical uplink control channel to transmit channel states information, and
the receiving unit which receives, from the base station apparatus, the radio resource control signal that allocates the physical uplink shared channel to transmit the channel state information,
a transmitting unit which periodically transmits, to the mobile station apparatus, the channel states information using the physical uplink control channel in case that the physical uplink control channel has been allocated, and
the transmitting unit which periodically transmits, to the base station apparatus, the channel state information using the physical uplink shared channel in case that the physical uplink shred channel has been allocated.

7. A mobile station apparatus in a mobile communication system in which the mobile station apparatus transmits uplink data to a base station apparatus using a physical uplink shared channel that is allocated by an uplink data transmission permission signal, the mobile station apparatus comprising:

a receiving unit which receives, from the base station apparatus, a radio resource control signal including a first transmission interval to transmit channel states information using the physical uplink shared channel, and the receiving unit which receives, from the base station apparatus, the uplink data transmission permission signal including information that sets the fact the channel states information is to be transmitted using the physical uplink shared channel, and a transmitting unit which periodically transmits, to the base station apparatus, the channel states information using the physical uplink shared channel in accordance with the first transmission interval, in case that it has been set that the channel states information is to be transmitted using the physical uplink shared channel.

8. The mobile station apparatus according to claim 7, wherein the mobile station apparatus comprises:

the receiving unit which receives, from the base station apparatus, a radio resource control signal including a second transmission interval to transmit the channel states information using a physical uplink control channel, the transmitting unit which periodically transmits, to the base station apparatus, the channel states information using the physical uplink control channel in accordance with the second transmission interval, and the transmitting unit which periodically transmits, to the base station apparatus, the channel states information using the physical uplink shared channel in accordance with the first transmission interval, in case that it has been set that the channel states information is to be transmitted using the physical uplink shared channel.

9. A mobile station apparatus in a mobile communication system in which the mobile station apparatus transmits uplink data to a base station apparatus using a physical uplink shared channel that is allocated by an uplink data transmission permission signal, the mobile station apparatus comprising:

a receiving unit which receives, from the base station apparatus, a radio resource control signal including a transmission interval to transmit channel states information using first resources of the physical uplink shared channel, the receiving unit which receives, from the base station apparatus, the uplink data transmission permission signal, a transmitting unit which periodically transmits, to the base station apparatus, the channel states information using the first resources of the physical uplink shared channel in accordance with the transmission interval, and the transmitting unit which transmits, to the base station apparatus, the channel states information using second resources of the physical uplink shared channel that is allocated by the uplink data transmission permission signal, in case that the second resources of the physical uplink shared channel have been allocated by the uplink data transmission permission signal in transmitting the channel states information using the first resources of the physical uplink shared channel.

10. A communication method for a base station apparatus in a mobile communication system in which a mobile station apparatus transmits uplink data to the base station apparatus using a physical uplink shared channel that is allocated by an uplink data transmission permission signal, the communication method comprising:

transmitting, to the mobile station apparatus, a radio resource control signal including a transmission interval for the mobile station apparatus to transmit channel states information using the physical uplink shared channel, transmitting, to the mobile station apparatus, the uplink data transmission permission signal including information that sets the fact that the channel states information is to be transmitted using the physical uplink shared channel.

11. A communication method for a mobile station apparatus in a mobile communication system in which the mobile station apparatus transmits uplink data to a base station apparatus using a physical uplink shared channel that is allocated by an uplink data transmission permission signal, the communication method comprising:

receiving, from the base station apparatus, a radio resource control signal that a physical uplink control channel to transmit channel states information, receiving form the base station apparatus, a radio resource control signal that allocates the physical uplink shared channel to transmit the channel state information, periodically transmitting, to the base station apparatus, the channel states information using the physical uplink control channel in case that the physical uplink control channel has been allocated, and periodically transmitting, to the base station apparatus, the channel states information using the physical uplink shared channel in case that the physical uplink shared channel has been allocated.

12. A communication method for a mobile station apparatus in a mobile station apparatus in which the mobile station apparatus transmits uplink data to a base station apparatus using a physical uplink shared channel that is allocated by an uplink data transmission permission signal, the communication method comprising:

receiving, from the base station apparatus, a radio resource control signal including a first transmission interval to transmit channel states information using a physical uplink shared channel, receiving, from the base station apparatus, the uplink data transmission permission signal including information that sets the fact that the channel states information is to be transmitted using the physical uplink shared channel, and periodically transmitting, to the base station apparatus, the channel states information using the physical uplink shared channel in accordance with the first transmission interval, in case that it has been set that the channel states information is to be transmitted using the physical uplink shared channel.

13. The communication method for a mobile station apparatus according to claim 12, wherein receiving, from the base station apparatus, the radio resource control signal including a second transmission interval to transmit the channel states information using a physical uplink control channel, periodically transmitting, to the base station apparatus, the channel states information using the physical uplink control channel in accordance with the second transmission interval, and periodically transmitting, to the base station apparatus, the channel states information using the physical uplink shared channel in accordance with the first transmission interval, in case that it has been set that the channel states information is to be transmitted using the physical uplink shared channel.

14. A communication method for a mobile station apparatus in a mobile communication system in which the mobile station apparatus transmits uplink data to a base station apparatus using a physical uplink shared channel that is allocation by an uplink data transmission permission signal, the communication method comprising:

receiving, from the base station apparatus, a radio resource control signal including a transmission interval to transmit channel states information using first resources of the physical uplink shared channel, receiving, from the base station apparatus, the uplink data transmission permission signal, periodically transmitting, to the base station apparatus, the channel states information using the first resources of the physical uplink shared channel in accordance with the transmission interval, and transmitting, to the base station apparatus, the channel states information using second resources of the physical uplink shared channel that is allocated by the uplink data transmission permission signal, in case that the second resources of the physical uplink shared channel have been allocated by the uplink data transmission permission signal in transmitting the channel states information using the first resources of the physical uplink shared channel.

15. A mobile station apparatus in a mobile communication system in which the mobile station apparatus transmits uplink data to a base station apparatus using resources of a physical uplink shared channel, the mobile station apparatus comprising:

a receiving unit which receives, from a base station apparatus, a radio resource control signal including information, which is used for configuration of first resources of the physical uplink shared channel, and the receiving unit which receives, from the base station apparatus, an uplink data transmission permission signal which is used for allocation of second resources of the physical uplink shared channel, a transmitting unit which transmits, to the base station apparatus, channel state information using the second resources in case that the channel state information is being transmitted in a timing in which the first resources have been configured and the second resources have been allocated.

16. A base station apparatus in a mobile communication system in which a mobile station apparatus transmits uplink data to the base station apparatus using resources of a physical uplink shared channel, the base station apparatus comprising:

a transmitting unit which transmits, to the mobile station apparatus, a radio resource control signal including information which is used for configuration of first resources of the physical uplink shared channel, and the transmitting unit which transmits, the mobile station apparatus, an uplink data transmission permission signal which is used for allocation of second resources of the physical uplink shared channel, a receiving unit which receives, from the mobile station apparatus, channel state information using the second resources in case that the channel state information is being transmitted, by the mobile station apparatus, in a timing in which the first resources have been configured and the second resources have been allocated.

17. A communication method for a mobile station apparatus in a mobile communication system in which the mobile station apparatus transmits uplink data to a base station apparatus using resources of a physical uplink shared channel, the communication method comprising:

receiving, from a base station apparatus, a radio resource control signal including information which is used for configuration of first resources of the physical uplink shared channel, and receiving, from the base station apparatus, an uplink data transmission permission signal which is used for allocation of second resources of the physical uplink shared channel, transmitting, to the base station apparatus, channel state information using the second resources in case that the channel state information is being transmitted in a timing in which the first resources have been configured and the second resources have been allocated.

18. A communication method for a base station apparatus in a mobile communication system in which a mobile station apparatus transmits uplink data to the base station apparatus using resources of a physical uplink shared channel, the communication method comprising:

transmitting, to the mobile station apparatus, a radio resource control signal including information which is used for configuration of first resources of the physical uplink shared channel, and transmitting, to the mobile station apparatus, an uplink data transmission permission signal which is used for allocation of second resources of the physical uplink shared channel, receiving, from the mobile station apparatus, channel state information using the second resources in case that the channel state information is being transmitted, by the mobile station apparatus, in a timing in which the first resources have been configured and the second resources have been allocated.

* * * * *